UNITED STATES PATENT OFFICE.

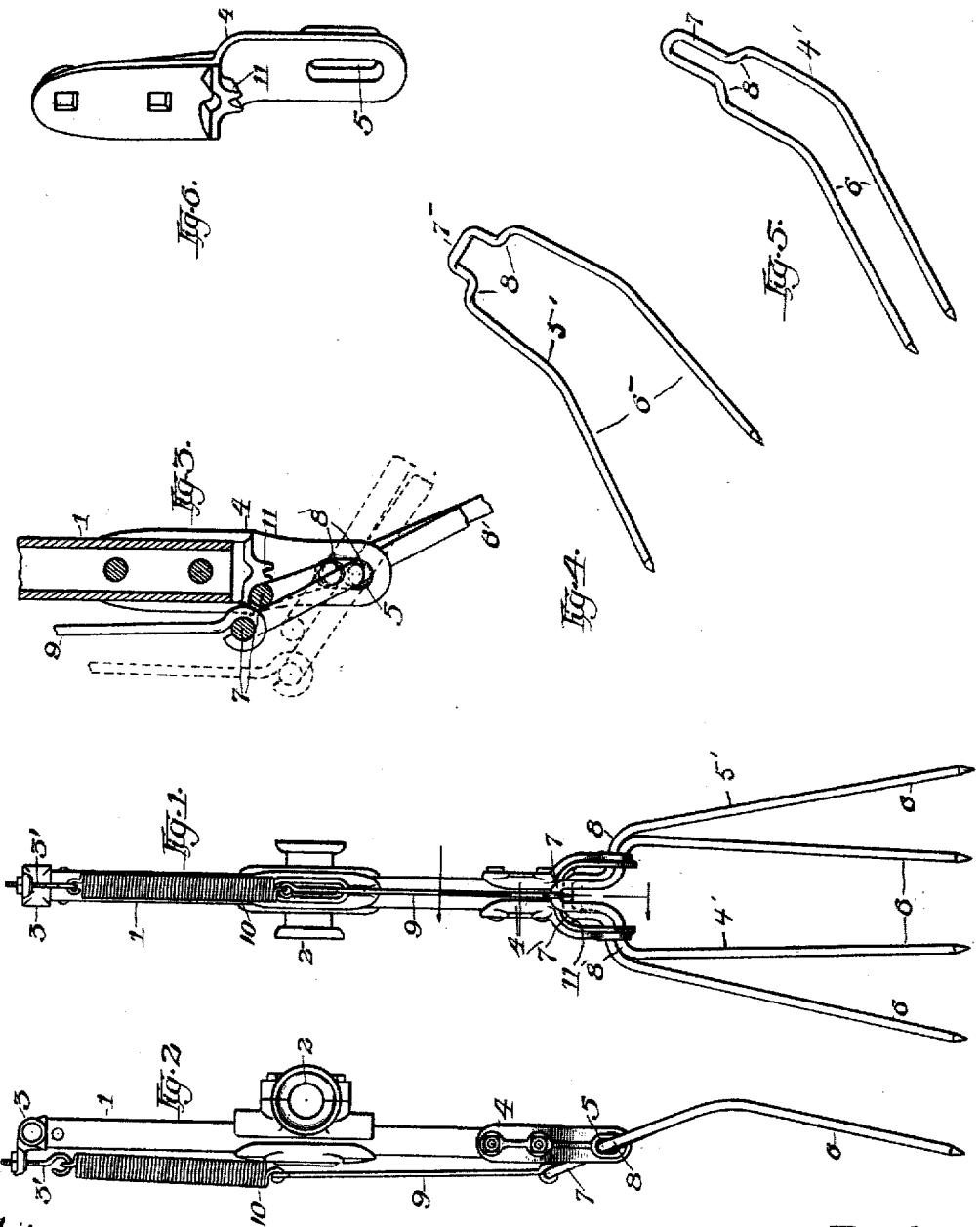

HERBERT B. SPERRY, OF SPRINGFIELD, OHIO, ASSIGNOR TO INTERNATIONAL HARVESTER COMPANY, A CORPORATION OF NEW JERSEY.

HAY-TEDDER.

No. 814,244.     Specification of Letters Patent.     Patented March 6, 1906.

Application filed September 20, 1905. Serial No. 279,208.

*To all whom it may concern:*

Be it known that I, HERBERT B. SPERRY, a citizen of the United States, residing at Springfield, in the county of Clark and State of Ohio, have invented certain new and useful Improvements in Hay-Tedders, of which the following is a specification, reference being had to the accompanying drawings, forming a part thereof.

My invention relates to hay-tedders, and particularly to that class having a series of forks mounted upon a multiple crank-shaft and designed to receive a vibratory motion therefrom; and it consists in an improved construction of the fork-tines whereby they are more easily mounted and controlled, the object being to provide a fork having two or more pairs of tines having independent shank portions that are controlled in their movements by a single element operatively connected with one of the shank portions.

I attain the above object by the mechanism illustrated by the accompanying drawings, in which—

Figure 1 is a plan view of the fork. Fig. 2 is a side view of Fig. 1. Fig. 3 is an enlarged cross-section of a part of Fig. 2. Figs. 4 and 5 are details of the tine construction, and Fig. 6 is a detail of the tine-mounting.

Similar reference characters denote similar parts throughout the several views.

1 represents the body of the fork, having secured thereto near its middle portion a journal-box 2, by means of which it is mounted upon the multiple crank-shaft. (Not shown.) Secured to the upper end of the body portion is a bearing-piece 3, adapted to receive one end of a controlling-link, (not shown,) and also an adjustable eyebolt 3', forming part of the tine-controlling mechanism. Secured to the opposite end of the body portion upon opposite sides thereof are clips 4, having at their lower ends lateral openings 5, that are elongated longitudinally relative to the fork-body. The fork-tines are preferably formed in middle and outside pairs 4' and 5', respectively, having what is commonly called a "hair-pin" shape with U-shaped upper ends or shank portions, the legs 6 of one of the pairs, forming the middle portion of the fork, being arranged in substantially parallel planes and connected with the U-shaped shank portion 7 by means of laterally-curved arm portions 8, adapted to be loosely embraced by the openings 5 in the clips 4. The other pair of tines has a wider and shorter shank portion adapted to partially embrace the shank of the middle pair and having the legs diverge outward toward their lower ends in a manner to provide equal spaces between the points of the tines, and the laterally-curved arm portions being loosely embraced by the openings in the clips 4 above the corresponding portions of the middle pair. The shank of the middle pair is longer than that of the outer pair of tines, and pivotally connected therewith is one end of a link 9, having its opposite end connected with one end of a coiled spring 10, that has its upper end connected with the eyebolt 3' and operative to draw the connected parts toward each other. The laterally-projecting arm portions of the tines are pivotally mounted in the openings in the clips, and the leg portions of the shank of the middle pair of tines overlap and bear against the head of the shank of the outside pair in a manner to hold the two pairs in operative alinement relative to their points, and a single tension device is in this manner made operative to control the two pairs of tines. When the tines are in their normal position, the head of the U-shaped shank of the outside pair of tines contacts with a bridge portion 11, integral with the clips 4, in a manner to limit the swing of the tines in one direction.

A fork constructed in this manner is more easily repaired in case one of the tines becomes broken, it being only necessary to replace one of the pairs.

What I claim as my invention, and desire to secure by Letters Patent, is—

1. A tedder-fork comprising, in combination, two pairs of tines having shank portions and laterally-curved arm portions connecting the tines with said shank portions, a body portion, said arm portions being pivotally connected with said body and having one shank overlapping the other, and a yielding connection between the body and the overlapping shank.

2. A tedder-fork comprising, in combination, two pairs of tines having shank portions and laterally-curved arm portions connecting the tines with said shank portions, a body portion, clips secured upon opposite sides and projecting beyond the end thereof, said clips having lateral openings adapted to receive the oppositely-disposed arm portions of each pair of tines, the shank portion of one pair overlapping the other, and a yielding connection between the opposite end of said body and the overlapping shank.

3. A tedder-fork comprising, in combination, two pairs of tines having shank portions and laterally-curved arm portions connecting the tines with said shank portions, the arm portions of one pair of tines partially embracing the arm portion of the other pair and one shank portion overlapping the other, a fork-body, clips secured upon opposite sides and projecting beyond the end thereof, said clips having lateral openings adapted to receive the oppositely-disposed arm portions of each pair of tines, and a yielding connection between the opposite end of said body and the overlapping shank.

4. A tedder-fork comprising, in combination, two pairs of tines having shank portions and laterally-curved arm portions connecting the tines with said shank portions, the arm portions of one pair of tines partially embracing the arm portions of the other pair and one shank portion overlapping the other, a fork-body, clips secured upon opposite sides and projecting beyond the end thereof, said clips having lateral openings that are elongated longitudinally relative to the fork-body and adapted to receive the oppositely-disposed arm portions of each pair of tines, and a yielding connection between the opposite end of said body and the overlapping shank.

5. A tedder-fork comprising, in combination, two pairs of tines having shank portions and laterally-curved arm portions connecting the tines with said shank portions, the arm portions of one pair of tines partially embracing the arm portions of the other pair and one shank portion overlapping the other, a fork-body, clips secured upon opposite sides and projecting beyond the end thereof, said clips having lateral openings adapted to receive the oppositely-disposed arm portions of each pair of tines, and a bridge-piece between said clips with which the overlapped shank is adapted to contact in a manner to limit its movement in one direction, and a yielding connection between the opposite end of said body and the overlapping shank.

6. A tedder-fork comprising, in combination, two pairs of tines having substantially U-shaped shank portions and laterally-curved arm portions connecting the tines with said shank portions, the U-shaped shank of the middle pair of tines being partially embraced by the side members of the other shank and having its head overlapping the head of the same, a fork-body, clips secured upon opposite sides and projecting beyond the end thereof, said clips having lateral openings adapted to receive the oppositely-disposed arm portions of each pair of tines, and a yielding connection between the fork-body and said overlapping shank.

In witness whereof I hereto affix my signature in presence of two witnesses.

HERBERT B. SPERRY.

Witnesses:
IVAN W. CLARK,
MINNIE E. TULLIS.